Aug. 30, 1927.
P. G. EHRHARDT
PRESS RING WASHER
Filed July 2, 1926
1,640,650
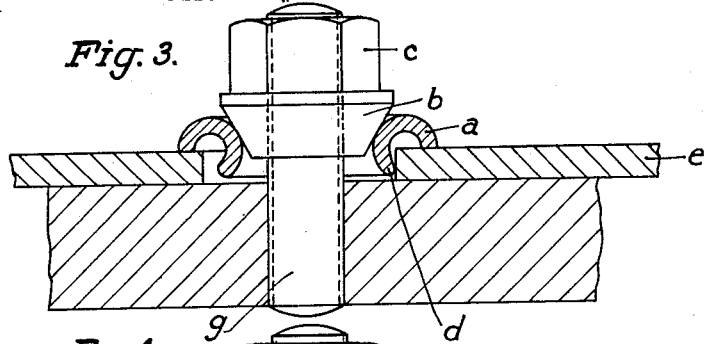
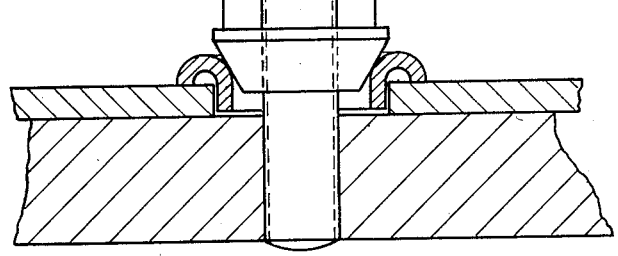
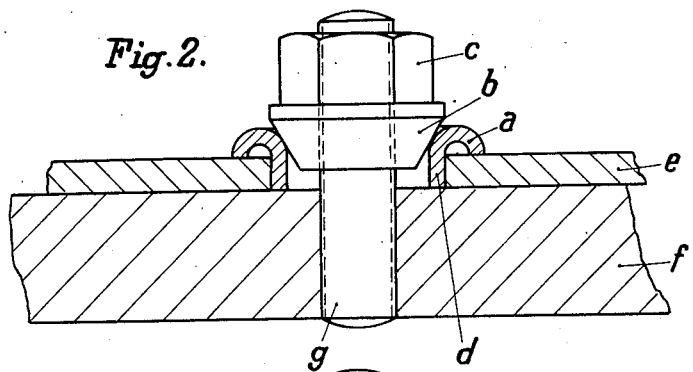
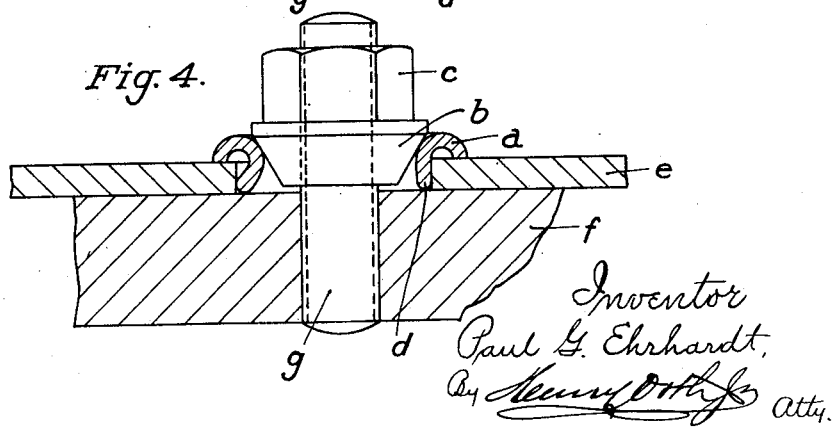
Inventor
Paul G. Ehrhardt,
By Henry Orth Jr. Atty.

Patented Aug. 30, 1927.

1,640,650

UNITED STATES PATENT OFFICE.

PAUL GEORG EHRHARDT, OF FRANKFORT-ON-THE-MAIN, GERMANY.

PRESS-RING WASHER.

Application filed July 2, 1926, Serial No. 120,224, and in Germany May 11, 1925.

This invention relates to press-rings intended to be used as washers, for example under screws and nuts.

As is well known the connection of sheet metal parts having thin walls, and also the connection of parts made of soft and easily deformable material, involves difficulties when the connection has to be made by screwing. The difficulty is due to the fact that the specific surface pressure between screw bolts and the walls of the holes or openings into which they are screwed, and between nuts (or bolt heads) and the surface of the part to be fixed thereby, exceeds the permissible strain the material is capable of supporting.

The present invention is designed to remove this disadvantage, which is effected by the addition of an auxiliary member to the screw devices, which auxiliary member simultaneously reduces the specific pressure upon the walls of the holes and distributes the pressure of the screw over a larger surface. At the same time this device can itself form a locking device for the screw.

In the accompanying drawings illustrating the invention,

Figs. 1 and 2 show one constructional form;

Figs. 3 and 4 show another constructional form.

In Figs. 1 and 3 the device is represented in the position of the parts before the screwing down of the nut, while in Figs. 2 and 4 the device is shown in the position of the parts after the nut has been screwed down.

Referring to the drawings, a J-shaped ring $a$ is used as a washer, against the inner surface of which the conical part $b$ of the nut $c$ abuts. The lower face of the collar-shaped projection $d$ of the ring $a$ and the upper face of the part $f$, with which the part $e$ is to be connected by means of the bolt $g$, may be arranged at a certain distance from one another before the application of the nuts $c$, (see Figs. 1 and 3). After the tightening of the nut $c$, as shown in Figs. 2 and 4, the washer $a$ is deformed by the conical part $b$ of the nut $c$ in such a manner that the collar-shaped part $d$ fits exactly into the bore of the part $e$, and is seated with its lower edge solidly upon the part $f$. At the same time the upper edge of the ring $a$ is pressed solidly upon the surface of the part $e$, so that the pressure is distributed over a ring shaped surface having the outer diameter of the ring $a$.

If the ring $a$ is made of spring material preferably steel the whole system remains, even after the complete tightening of the nut $c$, under tension such that the pressure of the conical part into the ring $a$ acts in the manner of the known safety device against undesired loosening of the nut.

The ring can further be formed in such a manner that upon the tightening of the nut the outer periphery first engages and then transmits the full pressure of the screw, and only when the screw is completely tightened up solid does the edge of the part $d$ engage upon the part $f$, while at the same time the part $d$ is pressed outwardly by the conical part until it abuts against the bore of the part $e$.

The arrangement can also be applied in a somewhat altered form, in order to secure the screwing together of two parts, if the axis of the bore of the part $e$ and the axis of the bolt $e$ do not exactly coincide, that is, if they are arranged somewhat eccentrically relatively to one another (see Figs. 3 and 4). In this case a ring $a$ of similar form to that shown in Figs. 1 and 2 is used, only with the difference that the edge of the collar-shaped part $d$ is rolled somewhat outwardly. Hereby the result is obtained that the part $d$ when pressing upon the lower part $f$ can be made by deformation to abut all round its periphery against the wall of the bore of the part $e$. The dimensions of the parts may be so chosen that the limit of tightening of the screw is only reached when the collar-shaped part $d$ comes into abutment against the wall of the bore of the part $e$ all round its periphery, without any damage to the part $e$ being caused hereby. For this constructional form of the washer-ring no springy material ought to be used, but the washer-ring $a$ must be made of yielding material which supports a considerable deformation without splitting and breaking.

I claim:—

1. The combination with a first part, and a second part connected to the first part, of a bolt passing through an opening of the said second part, this opening having a greater diameter than the diameter of the said bolt, a ring-formed washer, having a J-shaped cross section, the inner flange of which has a greater length than the outer flange, the said inner flange entering into the annular space between the bolt and the wall of the said opening, the said outer flange resting upon the surface of the said second part and in connection with the said bolt means exerting an axial pressure upon the said washer, the said washer being deformed by said pressure so that the diameter of the inner flange is enlarged and the outer face of the said inner flange is forced into contact with the wall of the said opening.

2. In a device according to claim 1, means exerting a radial pressure on the said inner flange of the said washer.

3. In a device according to claim 1, the said means for exerting the axial pressure also exerting a radial pressure on the said inner flange of the said washer.

4. In combination, a first part, a second part connected to the first part, a bolt passing through an opening of the said second part, this opening having a greater diameter than the diameter of the said bolt, a ring-formed washer, having a J-shaped cross section, the inner flange of which has a greater length than the outer flange, the said inner flange entering into the annular space between the bolt and the wall of the said opening, the said outer flange resting upon the surface of the said second part and in connection with the said bolt means including inclined surfaces exerting an axial and a radial pressure upon the said washer, the said washer being deformed by said pressure so that the outer face of the said inner flange is forced into contact with the wall of the said opening.

5. In combination, a first part, a second part connected to the first part, a threaded bolt passing through an opening of the said second part, this opening having a greater diameter than the diameter of the said bolt, a ring-formed washer, having a J-shaped cross section, the inner flange of which has a greater length than the outer flange, the said inner flange entering into the annular space between the bolt and the wall of the said opening, the said outer flange resting upon the surface of the said second part and in connection with the said threaded bolt, a nut on the said threaded bolt exerting an axial pressure upon the said washer, the said washer being deformed by said pressure so that the diameter of the inner flange is enlarged and the outer face of the said inner flange is forced into contact with the wall of the said opening.

6. In a device according to claim 5, the said nut being provided with a conical surface exerting also a radial pressure on the said inner flange of the said washer.

7. In a device according to claim 1, the edges of the flanges of the said washer having such an axial distance from each other that the said washer in its undeformed state abuts only with the edge of one flange against the surface opposite to said edge and that the deformed washer abuts also with the edge of the other flange against the surface opposite to the said edge.

8. In a device according to claim 1, the edges of the said flanges of the said washer having such an axial distance from each other that the said washer in its undeformed state abuts only with the edge of the outer flange against the surface opposite to said edge and that the deformed washer abuts also with the edge of the inner flange against the surface opposite to the said edge.

9. In a device according to claim 1, the edges of the said flanges of the said washer having such an axial distance from each other that the said washer in its undeformed state abuts only with the edge of the outer flange against the surface of the said second part and that the deformed washer abuts also with the edge of the inner flange against the surface of the said first part.

10. In a device according to claim 1, the lower part of the said inner flange of the said washer being bent outwards.

11. In a device according to claim 1, the said washer being made of elastic material.

In testimony whereof I affix my signature.

PAUL G. EHRHARDT.